L. N. STEVENOT.
TRAILER ATTACHMENT.
APPLICATION FILED APR. 26, 1919.
1,325,867.
Patented Dec. 23, 1919.
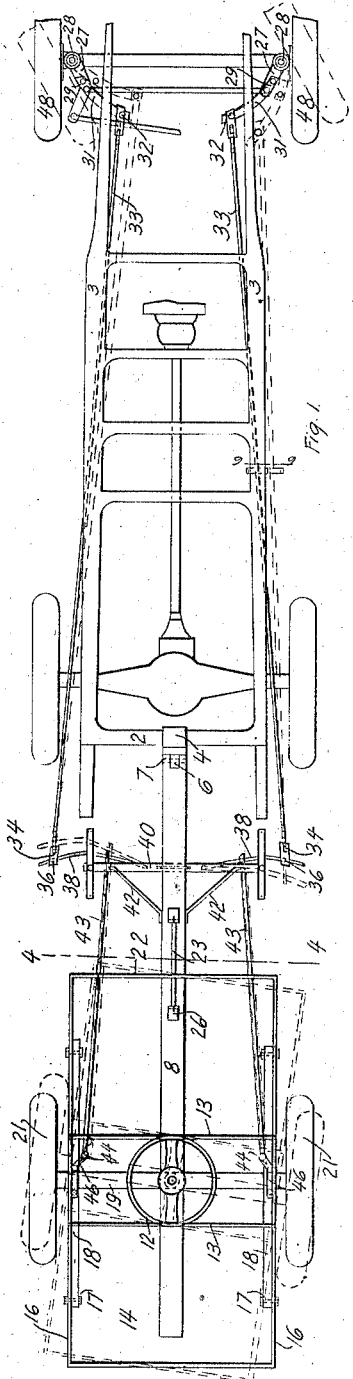
Fig. 1.
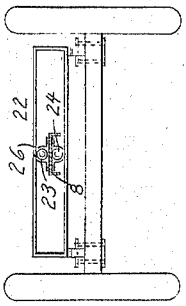
Fig. 4.
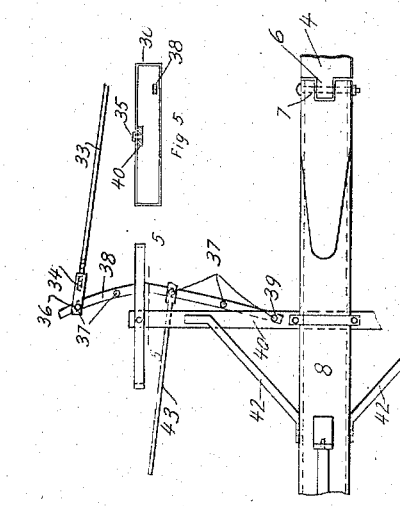
Fig. 5.
Fig. 2.
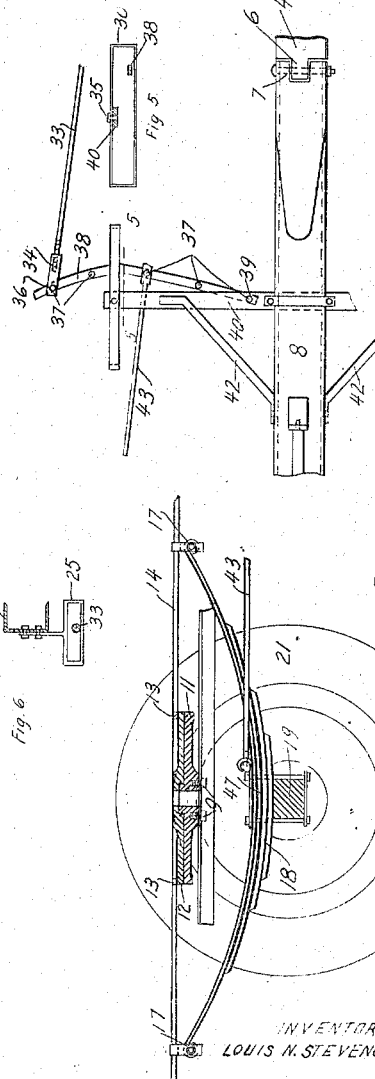
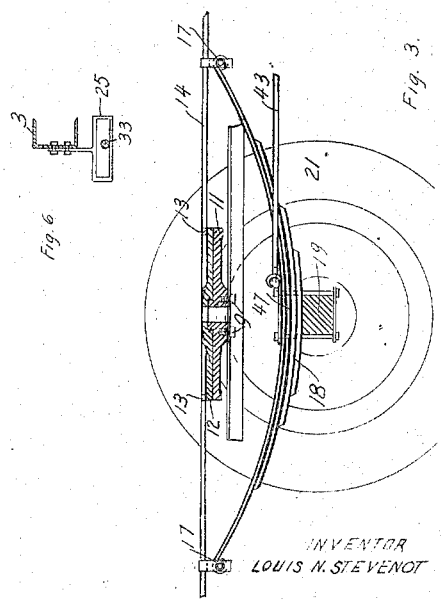
Fig. 3.
INVENTOR
LOUIS N. STEVENOT

UNITED STATES PATENT OFFICE.

LOUIS N. STEVENOT, OF OAKLAND, CALIFORNIA, ASSIGNOR OF ONE-THIRD TO EDWARD V. GOLLY, OF BERKELEY, CALIFORNIA, AND ONE-THIRD TO SILVIO G. BACIGALUPI, OF SAN FRANCISCO, CALIFORNIA.

TRAILER ATTACHMENT.

1,325,867.      Specification of Letters Patent.      Patented Dec. 23, 1919.

Application filed April 26, 1919. Serial No. 292,913.

*To all whom it may concern:*

Be it known that I, LOUIS N. STEVENOT, a citizen of the United States, residing at Oakland, in the county of Alameda and State of California, have invented new and useful Improvements in Trailer Attachments, of which the following is a specification.

The present invention relates to means for connecting a trailer to a self-propelled vehicle which will insure the trailer traveling in substantially the same path as the vehicle, when the latter is turning a corner or rounding a curve. The object of the invention is to provide such means which will be cheap and simple in construction, which will not require any material change in the mechanism of the vehicle, and which can be readily adjusted to fit vehicles of all sizes.

In the accompanying drawing, Figure 1 is a plan view of a self-propelled vehicle and a trailer connected in accordance with my invention, certain parts being broken away or omitted; Fig. 2 is an enlarged plan view illustrating the connection between the vehicles; Fig. 3 is an enlarged vertical section of a portion of the trailer; Fig. 4 is a cross sectional view on the line 4—4 of Fig. 1; Fig. 5 is a vertical cross section on the line 5—5 of Fig. 2; Fig. 6 is a similar cross section on the line 6—6 of Fig. 1.

Referring to the drawing, 1 indicates a self-propelled vehicle. To the rear bar 2 of the frame 3 of said vehicle is attached a bar 4, which extends rearwardly, and to a reduced rear end 6 of said bar is pivoted, as shown at 7, a forked forward end of a longitudinally extending pole 8, to which is secured, as shown at 9, a ring 11.

Upon said lower ring 11 is pivotally mounted an upper ring 12, which is secured to transverse bars 13 of the body 14 of a trailer. Longitudinal members 16 of said body have slidable engagements 17 with the ends of carriage springs 18, supported at their middle points upon a wheel axle 19, carrying at its ends wheels 21. A front member 22 of the frame of said body is also supported on upper and lower rollers 23, 24, the ends of which are carried by brackets 26 on the upper and lower sides of said pole 8, here shown as a channel iron.

To the arms 27 which turn the steering knuckles 28 are secured, as shown at 29, extensions 31, and, to the ends of said extensions 31 are pivotally secured, as shown at 32, the front ends of rods 33, extending rearwardly through guide-ways or supports 25 secured to the frame 3 and screwed into sleeves 34 which are each pivotally connected at their rear ends, as shown at 36, to any one of a series of holes 37 in an arm 38, the inner end of which is pivotally secured, as shown at 39, to a cross bar 40, secured to the channel-shaped pole 8 and additionally supported by oblique struts 42 connected to said pole. Said arm is slidably supported by a guide-way 30 secured as shown at 35 to the cross bar 40. In any one of the holes 37 in said arm 38 is pivoted the front end of a rod 43, the rear end of which is pivotally connected, as shown at 44, to an arm 46 extending from a clamp 47 which clamps the carriage spring to the axle shaft.

It results from this construction that any change in direction of the front wheels 48 is accompanied by a change in the opposite direction of the wheels 21 of the trailer, thus facilitating the turning of the trailer with the turning of the vehicle.

I claim:—

1. In combination with an automobile, inward extensions secured to the steering arms extending from the steering knuckles of the front wheels of the automobile, a trailer body, a pole therefor pivotally connected to a rear portion of the frame of the automobile to vibrate vertically, an axle on which said body is supported to turn horizontally relative thereto, a cross bar on the front portion of said pole, arms pivoted to said cross bar on opposite sides of the pole, and links connecting each arm with the extension and the wheel axle of the trailer on the same side of the pole as said arm.

2. In combination with an automobile, inward extensions secured to the steering arms extending from the steering knuckles of the front wheels of the automobile, a trailer body, a pole therefor pivotally connected to a rear portion of the automobile to vibrate vertically, an axle upon which said body is supported to turn horizontally relative thereto, a cross bar on the front portion of said pole, arms pivoted to said cross bar on opposite sides of the pole, links extending forwardly and rearwardly and connecting each arm with the extension and the wheel axle of the trailer on the same side of the pole as said arm, a loop-shaped guide for said arm extending longitudinally of the vehicle and secured to the cross bar, and a loop-shaped guide for the forward link extending transversely of the vehicle and secured to its frame.

LOUIS N. STEVENOT.